Patented Nov. 8, 1938

2,136,133

UNITED STATES PATENT OFFICE 2,136,133

PYRAZOLE-ANTHRONES AND PROCESS OF MAKING SAME

Hermann Hauser, Binningen, and Max Bommer, Riehen, Switzerland, assignors to the firm Society of Chemical Industry in Basle, Basel, Switzerland No Drawing. Application January 21, 1937, Serial No. 121,710. In Switzerland February 7, 1936

7 Claims. (Cl. 260—312)

This invention relates to the manufacture of pyrazole-anthrones by causing an anthraquinone or a leuco-compound thereof, which contains in α-position a substituent capable of being exchanged, to react with a hydrazine of the general formula $H_2N-NH-CH_2-X$ wherein X indicates hydrogen, alkyl, aralkyl or aryl, and, if desired, treating the product thus obtained with an agent for introducing substituents and/or a condensing agent.

Suitable anthraquinones or their leuco-compounds containing in α-position a substituent capable of being exchanged are, for example, α-halogen-, α-amino-, α-hydroxy- and α-alkoxy-anthraquinones and their leuco-compounds. These may contain further substituents, for instance alkyl-, nitro-, alkoxy- or amino-groups, as well as halogens, for example chlorine or bromine.

Suitable hydrazines of the general formula $H_2N-NH-CH_2-X$ wherein X indicates hydrogen, alkyl, aralkyl or aryl, are for example methyl hydrazine, ethyl hydrazine, benzyl hydrazine and sulfates thereof. These benzyl hydrazines may carry substituents in the phenyl radical, for example, halogen, nitro-groups, alkoxy- and alkyl-groups.

The reaction of the anthraquinone or its leuco-compounds with the hydrazine occurs at a raised temperature, preferably in the presence of a solvent or diluent, such as pyridine or amyl alcohol, as well as in the presence of a substance which facilitates the reaction, for instance an alkali carbonate.

The products obtainable by the invention may be treated with an agent introducing substituents and/or a condensing agent. For example, those pyrazole-anthrones which contain an amino-group in the anthrone radical, if necessary besides other substituents, may be mono- or dialkylated ($CH_3$, $C_2H_5$ and the like) or arylated. Further, these amino-groups may also be acidylated, whereby radicals of aliphatic or aromatic carboxylic acids, for instance the radicals of acetic acid, propionic acid, benzoic acids, naphthoic acids and anthraquinone carboxylic acids, can be introduced. For example also the product obtained by reaction of 5-amino-1-chloranthraquinone with methyl hydrazine may be treated with an acylating agent, such as an anthraquinone-2-carboxylic acid halide and an anthraquinone-1-carboxylic acid halide, or the product formed by the reaction of hydrazine with a leuco-anthraquinone containing in α-position a group capable of being exchanged may be oxidized, for instance by means of air or a perborate; furthermore, the products obtainable by the invention and containing a halogen atom may be caused to react with primary and secondary aliphatic and aromatic amines, for example alkylamines, aminobenzenes, amino-naphthalenes and amino-anthraquinones. The anthrimides obtainable with amino-anthraquinones can be converted into products containing the carbazole ring, for example by the action of sulfuric acid or aluminium chloride in combination with alkali chlorides or pyridine.

The products may also be treated with an aldehyde, for instance formaldehyde or an halogenating agent whereby further valuable products are obtained.

The products may also be purified by crystallization or by conversion into their salts formed from strong acids, or by treatment with alkali hypochlorite solution. They may also be converted by known methods into the leuco-derivatives, for example into the leuco-sulfuric acid esters.

The products of the invention are in part valuable new intermediate products and in part dyestuffs. The latter can be used for dyeing and printing vegetable fibres, for instance cotton, or for coloring lacquers and plastic masses, as well as for dyeing artificial silk. The dyeings and printings produced are very fast.

The following examples illustrate the invention, the parts being by weight unless stated otherwise, and the parts by weight being related to the parts by volume as is the kilo to the litre:—

Example 1

24 parts of 1-chloranthraquinone, 18 parts of an aqueous solution containing about 30 per cent. of methyl hydrazine, 10 parts of calcined sodium carbonate and 150 parts of pyridine are heated together to boiling for 12 hours. The mass of the formula

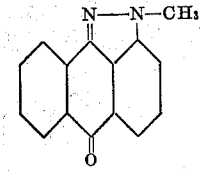

is filtered when cold and freed from inorganic constituents by boiling it with water. In this manner the product is obtained in the form of beautifully crystalline, yellow needles which melt at 188–189° C. In concentrated sulfuric acid it dissolves to an orange solution. When the solution is poured into water yellow flocks are obtained. In alcohol it dissolves to some extent to a yellow solution of intensely green fluorescence.

Example 2

13 parts of 1:5-aminochloranthraquinone, 18 parts of an aqueous methyl hydrazine solution of about 30 per cent. strength, 5 parts of calcined sodium carbonate and 150 parts of pyridine are together heated to boiling for 10 hours. After cooling, the new compound of the formula

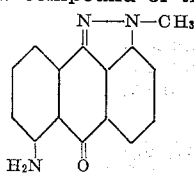

which has separated in the form of orange crystals is filtered and washed with hot water. It dissolves in concentrated sulfuric acid to an orange solution and melts at 234–235° C.

Example 3

26 parts of 1:4-amino-chloranthraquinone, 20 parts of an aqueous solution of about 30 per cent. strength of methyl hydrazine, 300 parts of pyridine and 10 parts of calcined sodium carbonate are heated together to boiling for 10 hours. The mass is then introduced into water and the product of reaction thus precipitated of the formula

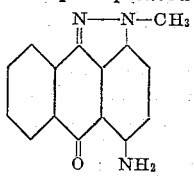

is filtered. It dissolves in concentrated sulfuric acid to a yellow solution having a green fluorescence, from which, on dilution with some water, it is obtained in the form of small needles.

The pyrazole-anthrones which are obtained from 1:4-amino-chloranthraquinone and ethylhydrazine or benzylhydrazine behave analogously.

Example 4

12 parts of 1-chloranthraquinone, 10 parts of an aqueous methyl hydrazine solution of about 30 per cent. strength, 5 parts of calcined sodium carbonate and 120 parts of amyl alcohol are heated together to boiling for 10 hours. The yellow product is filtered when cold and the solid matter washed with alcohol and hot water. By recrystallization from about 5 times its weight of pyridine the washed product is obtained in a purified form and melts at 188–189° C. It is identical with the product obtained as described in Example 1.

Example 5

3 parts of the product obtained as described in Example 2, 4 parts of anthraquinone-2-carboxylic acid chloride and 120 parts of ortho-dichlorobenzene are together heated to boiling for about 1 hour. The product of the formula

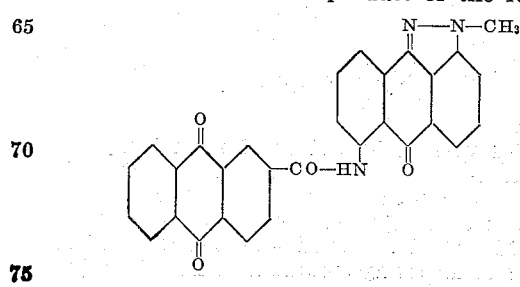

separates in part in the form of small yellow needles, while the mixture is still hot. When dry it is a yellow powder which dissolves in concentrated sulfuric acid to a red solution. In a yellow-olive vat it dyes cotton very strong and very pure yellow tints which are of very good fastness to washing chlorine and bowking.

If the product of Example 3 is caused to react with anthraquinone-2-carboxylic acid-chloride there is obtained a dyestuff much greener than that described above. In either case benzoylchloride may be used instead of the anthraquinone-2-carboxylic acid-chloride, whereby compounds are obtained which are also of pure yellow and crystallize very beautifully.

Example 6

3 parts of the product obtained as described in Example 2 are mixed with 3 parts of benzoylchloride and 120 parts of ortho-dichlorobenzene and the mixture is heated for half-an-hour to boiling. The product of the reaction of the formula

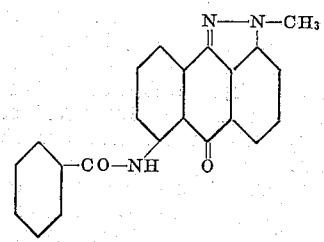

which separates in the form of small yellow needles dissolves in concentrated sulfuric acid to a red solution. It cannot be vatted with caustic soda solution and hydrosulfite. It may be used as a varnish colour.

Example 7

5 parts of 5-amino-1:9-(N-methyl)-pyrazolanthrone obtainable, for instance, as described in Example 2, 5 parts of 2-chloranthraquinone, 120 parts of nitrobenzene, 10 parts of anhydrous sodium acetate and 0.5 part of cupric acetate are mixed together and the mixture is heated to boiling for 12 hours. The product of the reaction of the formula

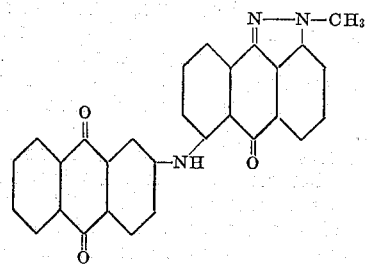

is filtered when the mass is cold. It dissolves in concentrated sulfuric acid to an olive-green solution from which, when poured into water, red flocks precipitate. The vat prepared from this dyestuff dyes cotton Bordeaux red. The dyeings show very good fastness to washing.

Example 8

3 parts of 4-amino-1:9-(N-methyl)-pyrazolanthrone of melting point 236–237° C., which may be obtained for instance by recrystallizing from pyridine the product obtained as described in Example 3, are mixed with 4 parts of anthraquinone-2-carboxylic acid chloride and 120 parts of ortho-dichlorobenzene and the mixture is heated to boiling for half-an-hour. The product of the formula

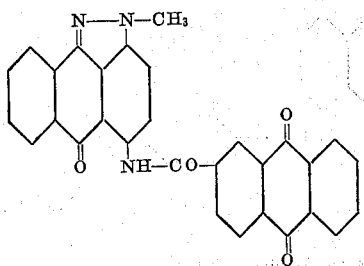

which separates in the form of small yellow needles is filtered cold. It dyes cotton in a yellow-olive vat strong greenish-yellow tints. The dyeings show very good fastness to chlorine, washing and kier-boiling.

*Example 9*

4 parts of 8-amino-1:9-(N-methyl)-pyrazolanthrone of melting point 230° C., which may be obtained, for instance, by the reaction of 1:8-amino-chloranthraquinone with methyl hydrazine as described in Example 2, are mixed with 5 parts of anthraquinone-2-carboxylic acid-chloride and 160 parts of trichloro-benzene and the mixture is heated to boiling for half-an-hour. The product of the formula

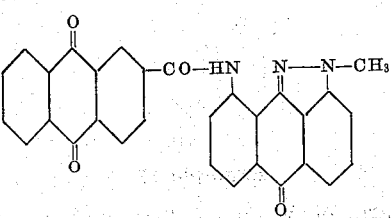

which separates in the form of pure yellow needles dyes cotton in an olive-green vat strong and pure greenish-yellow. The dyeings show good fastness to chlorine, washing and kier-boiling.

*Example 10*

5 parts of the 5-amino-1:9-(N-methyl)-pyrazolanthrone described in Example 2, are mixed with 4 parts of 1-chloro-2-anthraquinone-carboxylic acid-chloride and 120 parts of trichloro-benzene and the mixture is heated for half-an-hour at 170–180° C. The product of the reaction of the formula

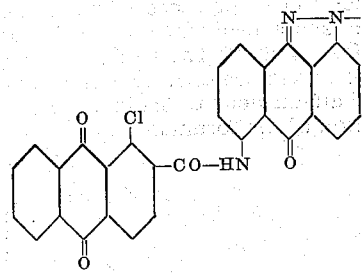

separates from the cooling mass and is filtered. It dissolves in concentrated sulfuric acid to a red solution; when this solution is introduced into water yellow flocks separate. The dyestuff dyes cotton yellow in a vat. The dyeings show good fastness to chlorine, washing, kier-boiling and light.

If instead of 5-amino-1:9-(N-methyl)-pyrazolanthrone there is used the 4 or 8 amino-derivative, similar dyestuffs are obtained; they dye cotton very pure yellow.

If one uses instead of 1:2-chloranthraquinone-carboxylic acid the 2:3-chloranthraquinone-carboxylic acid for the acylation similar dyestuffs are obtained which, however, are of weaker color with the exception of the dyestuff from 5-amino-1:9-(N-methyl)-pyrazolanthrone and 2:3-Chloranthraquinone-carboxylic acid-chloride which dyes cotton in a red-brown vat strong and pure greenish-yellow. The properties of fastness are good.

*Example 11*

36 parts of 1:4-chlorobenzoylamino-anthraquinone, 15 parts of an aqueous solution of methyl hydrazine containing about 5 parts of methyl hydrazine and 15 parts of anhydrous sodium acetate, are added to 360 parts of pyridine and the whole is heated to boiling for 10 hours. When the mass is cold the product of the reaction of the formula

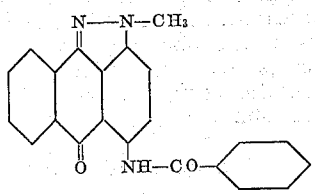

is separated by filtration and freed from inorganic constituents by extraction with boiling water. It is a bright yellow-green crystalline powder which, after one recrystallization from pyridine melts at 299–301° C.

By saponifying it with sulfuric acid of 90 per cent. strength at 90–95° C. there is obtained 4-amino-1:9-(N-methyl)-pyrazolanthrone which is identical with the product of the reaction of 1:4-amino-chloranthraquinone with methyl hydrazine described in Example 3. It dyes acetate silk very strong and pure greenish-yellow tints.

*Example 12*

37 parts of 1:3-dibromanthraquinone, 20 parts of an aqueous methyl hydrazine solution of about 30 per cent. strength and 15 parts of sodium acetate are mixed with 185 parts of pyridine and the mixture is heated to boiling for 10 hours. The product crystallizes from the cold mass in the form of yellow tables. It melts at 249–250° C. and is the 1:9-(N-methyl)-pyrazol-3-bromanthrone of the formula

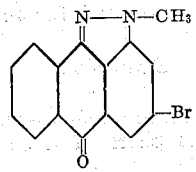

By reaction with 1-aminoanthraquinone in nitrobenzene and in presence of an agent which eliminates hydrogen halide, there is obtained from this body a vat-dyestuff which dyes cotton orange.

*Example 13*

22.3 parts of 1-aminoanthraquinone, 25 parts of isophthalic acid-chloride and 300 parts of ortho-dichlorobenzene are mixed together and the mixture is heated for half-an-hour to boiling. The mass is stirred when cold and the product of the reaction is isolated by filtration. 4 parts of this product are mixed with 2.5 parts of 5-amino-1:9-(N-methyl)-pyrazolanthrone obtained, for instance as described in Example 2, and 150 parts of ortho-dichlorobenzene, and the mixture is heated for half-an-hour to boiling. The new dyestuff is isolated by cooling and filtration. It is of the formula

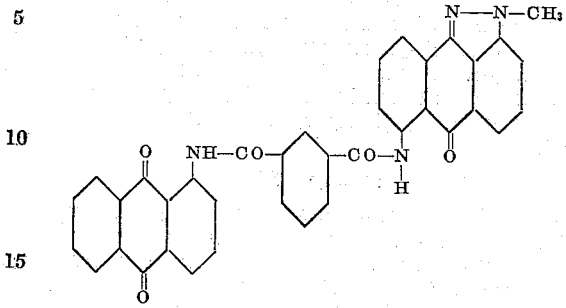

Cotton is dyed pure yellow tints both without soaping and after soaping. The dyeings show very good fastness to chlorine, washing and kier-boiling, and are characterized by the remarkable preservation of the fiber on exposure to light, which indeed is essentially better than the cotton dyeing obtainable by means of 1:5-dibenzoyl-diaminoanthraquinone.

*Example 14*

57 parts of 1-chloranthraquinone-2-carboxylic acid and 25 parts of calcined sodium carbonate are mixed with 626 parts of an aqueous solution of methyl hydrazine made, for example, by dissolving 32 parts of methyl hydrazine in 570 parts of water and adding 24 parts of caustic alkali, the mixture is heated for 18 hours to boiling, then filtered hot and from the filtrate the product is isolated by acidifying with hydrochloric acid. By recrystallization from 6 times its weight of pyridine the product of the formula

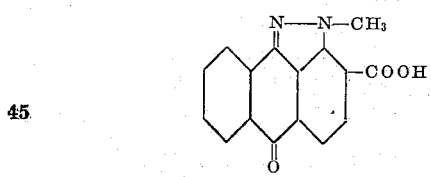

is obtained in the form of small yellow needles which melt above 300° C. In concentrated sulfuric acid the product dissolves to a pure orange solution. It may be used for making vat-dyestuffs.

*Example 15*

2.6 parts of 4-amino-1:9-(N-methyl)-pyrazolanthrone and 3.8 parts of a compound of the formula

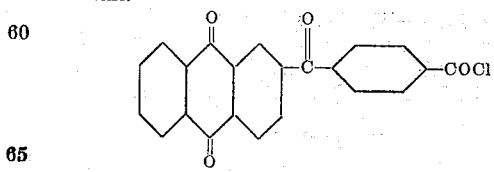

(which can for instance be made by condensation of anthraquinone-2-carboxylic acid-chloride with toluene, oxidation of the methyl group to the carboxyl group by means of chlorine in nitrobenzene at 160-170° C., and finally the conversion of the carboxylic acid into the above acid-chloride by means of phosphorous penta-chloride) are mixed with 150 parts of ortho-dichlorobenzene and the mixture is heated for half-an-hour at 180-190° C. The new dyestuff of the formula

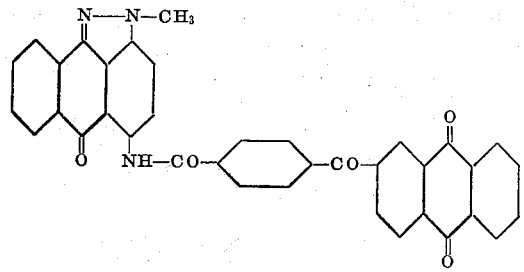

is filtered from the cold mixture. It dissolves in concentrated sulfuric acid to an orange solution. Cotton is dyed in a yellow-olive vat greenish-yellow tints.

*Example 16*

5 parts of 4-amino-1:9-(N-methyl)-pyrazolanthrone and 50 parts of acetic anhydride are mixed together and the mixture is heated for half-an-hour to boiling; the product is filtered when cold. It melts at 254-256° C. and dissolves in concentrated sulfuric acid to an orange solution, which, when poured into water, yields yellow flocks. It dyes acetate silk very strong and pure greenish-yellow tints. This dyestuff is the acetyl derivative of the formula

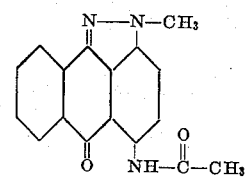

*Example 17*

2.5 parts of 5-amino-1:9-(N-methyl)-pyrazolanthrone, 4 parts of an acid-chloride of the formula

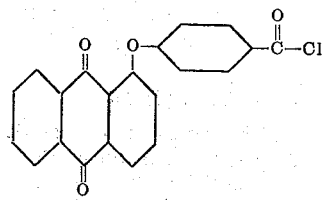

(this compound melts at 168-170° C.; it may be made for instance by the reaction of 1-chloranthraquinone with para-hydroxybenzoic acid in amyl alcohol and in presence of potassium carbonate and subsequent action of phosphorous pentachloride) and 120 parts of ortho-dichlorobenzene are mixed together and the mixture is heated for half-an-hour to boiling. The product of the reaction of the formula

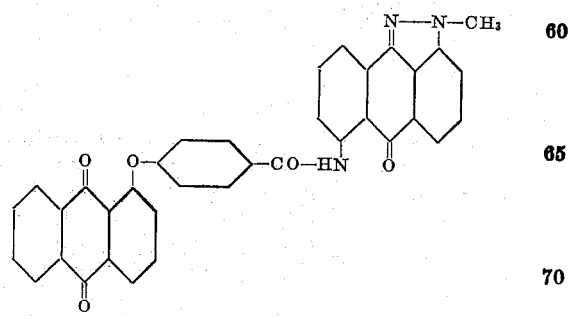

when dry is a yellow crystalline powder. It may be vatted at 40-50° C. and dyes cotton at 25-30° C. strong and pure yellow.

What we claim is:—

1. Process for the manufacture of pyrazole-anthrones, consisting in causing anthraquinones which contain in α-position substituents capable of being exchanged, to react with hydrazines of the general formula $H_2N-NH-CH_2X$ wherein X is a member of the group consisting of hydrogen, alkyl, aralkyl and aryl.

2. Process for the manufacture of pyrazole-anthrones, consisting in causing anthraquinones which are substituted in α-position by halogen, to react with hydrazines of the general formula $H_2N-NH-CH_2X$ wherein X is a member of the group consisting of hydrogen, alkyl, aralkyl and aryl.

3. Process for the manufacture of pyrazole-anthrones, consisting in causing anthraquinones which are substituted in α-position by halogen, to react with methyl hydrazine of the formula $H_2N-NH-CH_3$.

4. Process for the manufacture of pyrazole-anthrones, consisting in causing 1-chloro-5-amino-anthraquinone to react with methyl hydrazine of the formula $H_2N-NH-CH_3$.

5. Monopyrazole-anthrones of the formula

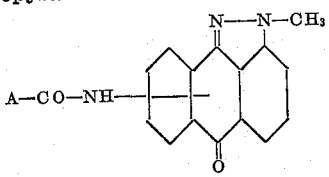

wherein A is an anthraquinonyl radical.

6. Monopyrazole-anthrones of the formula

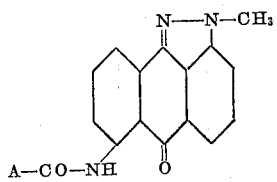

wherein A is an anthraquinonyl radical.

7. Monopyrazole-anthrone of the formula

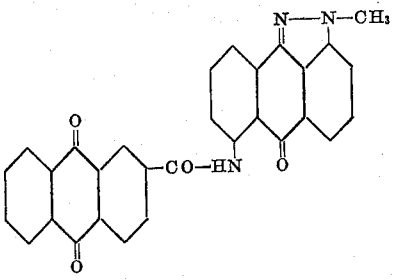

HERMANN HAUSER.
MAX BOMMER.